(12) United States Patent
Neppalli et al.

(10) Patent No.: US 9,189,392 B1
(45) Date of Patent: Nov. 17, 2015

(54) OPPORTUNISTIC DEFRAGMENTATION DURING GARBAGE COLLECTION

(75) Inventors: Srinivas Neppalli, Irvine, CA (US); Robert M. Fallone, Newport Beach, CA (US); William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 415 days.

(21) Appl. No.: 13/174,708

(22) Filed: Jun. 30, 2011

(51) Int. Cl.
G06F 12/02 (2006.01)
G06F 12/08 (2006.01)
G06F 3/06 (2006.01)

(52) U.S. Cl.
CPC ............ *G06F 12/0253* (2013.01); *G06F 3/064* (2013.01); *G06F 3/0611* (2013.01); *G06F 3/0613* (2013.01); *G06F 3/0647* (2013.01); *G06F 3/0676* (2013.01); *G06F 12/0888* (2013.01); *G06F 2206/1004* (2013.01)

(58) Field of Classification Search
None
See application file for complete search history.

(56) References Cited

U.S. PATENT DOCUMENTS

| | | | |
|---|---|---|---|
| 5,530,850 A | 6/1996 | Ford et al. | |
| 5,551,003 A * | 8/1996 | Mattson et al. | 711/136 |
| 5,604,902 A * | 2/1997 | Burkes et al. | 1/1 |
| 5,636,355 A * | 6/1997 | Ramakrishnan et al. | 711/113 |
| 5,734,861 A * | 3/1998 | Cohn et al. | 711/134 |
| 5,799,185 A | 8/1998 | Watanabe | |
| 5,819,290 A * | 10/1998 | Fujita | 711/100 |
| 5,819,310 A | 10/1998 | Vishlitzky et al. | |
| 6,018,789 A | 1/2000 | Sokolov et al. | |
| 6,065,095 A | 5/2000 | Sokolov et al. | |
| 6,067,199 A | 5/2000 | Blumenau | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,125,434 A | 9/2000 | Willard et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |

(Continued)

FOREIGN PATENT DOCUMENTS

WO 9910812 A1 3/1999

OTHER PUBLICATIONS

Chun Sei Tsai, et al., U.S. Appl. No. 12/788,041, filed May 26, 2010, 19 pages.

*Primary Examiner* — Nathan Sadler (57) ABSTRACT

The present invention is directed to systems and methods for opportunistically defragmenting a data storage device during garbage collection. During garbage collection, valid data is identified and cached in a buffer assigned to the garbage collection process. When the buffer has been filled or reached a threshold, the valid data in the buffer is then coalesced and rewritten back to the data storage medium. In addition, a translation table is reduced by updating its entries to indicate the new locations of the coalesced valid data.

17 Claims, 5 Drawing Sheets

(56) References Cited

U.S. PATENT DOCUMENTS

| | | |
|---|---|---|
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,324,631 B1 | 11/2001 | Kuiper |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,430,663 B1 | 8/2002 | Ding |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,160 B1 | 12/2002 | Schreck |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,978,283 B1 | 12/2005 | Edwards et al. |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |

(56) References Cited

U.S. PATENT DOCUMENTS

| | | |
|---|---|---|
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,124,272 B1 | 10/2006 | Kennedy et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,146,525 B2 | 12/2006 | Han et al. |
| 7,149,046 B1 | 12/2006 | Coker et al. |
| 7,149,822 B2 | 12/2006 | Edanami |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,315,917 B2 | 1/2008 | Bennett et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,363,421 B2 | 4/2008 | Di Sena et al. |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,373,477 B2 | 5/2008 | Takase et al. |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,409,522 B1 | 8/2008 | Fair et al. |
| 7,415,571 B1 | 8/2008 | Hanan |
| 7,424,498 B1 | 9/2008 | Patterson |
| 7,436,610 B1 | 10/2008 | Thelin |
| 7,437,502 B1 | 10/2008 | Coker |
| 7,440,214 B1 | 10/2008 | Ell et al. |
| 7,443,625 B2 | 10/2008 | Hamaguchi et al. |
| 7,447,836 B2 | 11/2008 | Zhang et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,516,355 B2 | 4/2009 | Noya et al. |
| 7,518,819 B1 | 4/2009 | Yu et al. |
| 7,519,639 B2 | 4/2009 | Bacon et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,552,282 B1 | 6/2009 | Bermingham et al. |
| 7,562,282 B1 | 7/2009 | Rothberg |
| 7,567,995 B2 | 7/2009 | Maynard et al. |
| 7,577,973 B1 | 8/2009 | Kapner, III et al. |
| 7,593,975 B2 | 9/2009 | Edwards et al. |
| 7,596,797 B1 | 9/2009 | Kapner, III et al. |
| 7,599,139 B1 | 10/2009 | Bombet et al. |
| RE41,011 E | 11/2009 | Han et al. |
| 7,619,841 B1 | 11/2009 | Kupferman |
| 7,624,137 B2 | 11/2009 | Bacon et al. |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,685,360 B1 | 3/2010 | Brunnett et al. |
| 7,688,540 B1 | 3/2010 | Mei et al. |
| 7,707,166 B1 | 4/2010 | Patterson |
| 7,721,059 B2 | 5/2010 | Mylly et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,783,682 B1 | 8/2010 | Patterson |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |

(56) References Cited

U.S. PATENT DOCUMENTS

| | | |
|---|---|---|
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,359,430 B1 * | 1/2013 | Fair ............................ 711/113 |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | Deforest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,521,972 B1 * | 8/2013 | Boyle et al. .................... 711/159 |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 2002/0138694 A1 | 9/2002 | Isshiki |
| 2002/0188800 A1 | 12/2002 | Tomaszewski et al. |
| 2003/0051110 A1 | 3/2003 | Gaspard et al. |
| 2003/0101383 A1 * | 5/2003 | Carlson ............................ 714/42 |
| 2004/0179386 A1 | 9/2004 | Jun |
| 2004/0268079 A1 | 12/2004 | Riedle et al. |
| 2005/0021900 A1 * | 1/2005 | Okuyama et al. ................. 711/4 |
| 2005/0071537 A1 | 3/2005 | New et al. |
| 2005/0216657 A1 | 9/2005 | Forrer et al. |
| 2006/0020849 A1 | 1/2006 | Kim |
| 2006/0106981 A1 | 5/2006 | Khurshudov et al. |
| 2006/0155917 A1 | 7/2006 | Di Sena et al. |
| 2006/0212674 A1 * | 9/2006 | Chung et al. .................. 711/202 |
| 2007/0027940 A1 | 2/2007 | Lutz et al. |
| 2007/0050390 A1 | 3/2007 | Maynard et al. |
| 2007/0198614 A1 * | 8/2007 | Zhang et al. .................... 707/205 |
| 2007/0208790 A1 | 9/2007 | Reuter et al. |
| 2008/0077762 A1 | 3/2008 | Scott et al. |
| 2008/0091872 A1 | 4/2008 | Bennett et al. |
| 2008/0263059 A1 | 10/2008 | Coca et al. |
| 2008/0263305 A1 | 10/2008 | Shu et al. |
| 2009/0049238 A1 | 2/2009 | Zhang et al. |
| 2009/0055450 A1 | 2/2009 | Biller |
| 2009/0094299 A1 | 4/2009 | Kim et al. |

(56) References Cited

U.S. PATENT DOCUMENTS

| | | |
|---|---|---|
| 2009/0113702 A1 | 5/2009 | Hogg |
| 2009/0164742 A1 | 6/2009 | Wach et al. |
| 2010/0153347 A1 | 6/2010 | Koester et al. |
| 2010/0287217 A1 | 11/2010 | Borchers et al. |
| 2010/0293354 A1 | 11/2010 | Perez et al. |
| 2010/0306551 A1 | 12/2010 | Meyer et al. |
| 2011/0226729 A1 | 9/2011 | Hogg |
| 2011/0231623 A1 | 9/2011 | Goss et al. |
| 2011/0283049 A1 | 11/2011 | Kang et al. |
| 2012/0102297 A1* | 4/2012 | Haines et al. .......... 711/209 |
| 2012/0159042 A1 | 6/2012 | Lott et al. |
| 2012/0173832 A1* | 7/2012 | Post et al. .......... 711/165 |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

* cited by examiner

OPPORTUNISTIC DEFRAGMENTATION DURING GARBAGE COLLECTION

BACKGROUND

Garbage collection is often performed in data storage devices that implement uni-directional write policies. For example, some non-volatile solid-state memory devices and shingled disk drives both program or write data to the media in one direction, whether the incoming data from the host has random or sequential logical addresses. Because data for logical addresses can be located at any physical location, garbage collection is needed to reclaim locations on the media that no longer contain valid data for future writes. For example, in a shingled disk drive, if a track stores both valid and invalid data, the valid data may be copied by the controller as part of garbage collection to a new location so that the entire track can be made available for future write operations.

BRIEF DESCRIPTION OF THE DRAWINGS

Systems and methods which embody the various features of the invention will now be described with reference to the following drawings, in which.

DETAILED DESCRIPTION

The present invention is directed to systems and methods for opportunistically defragmenting a data storage device, such as a shingled magnetic disk drive, during garbage collection. During garbage collection, the identified valid data (e.g., data that is to be kept) is cached. The valid data is coalesced, and when the cached data has been coalesced or fills the cache, it is written back to the data storage medium to reduce the number of required disk operations. In one embodiment, the valid data found during the garbage collection process is written back such that it can be read by a single disk operation Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1:
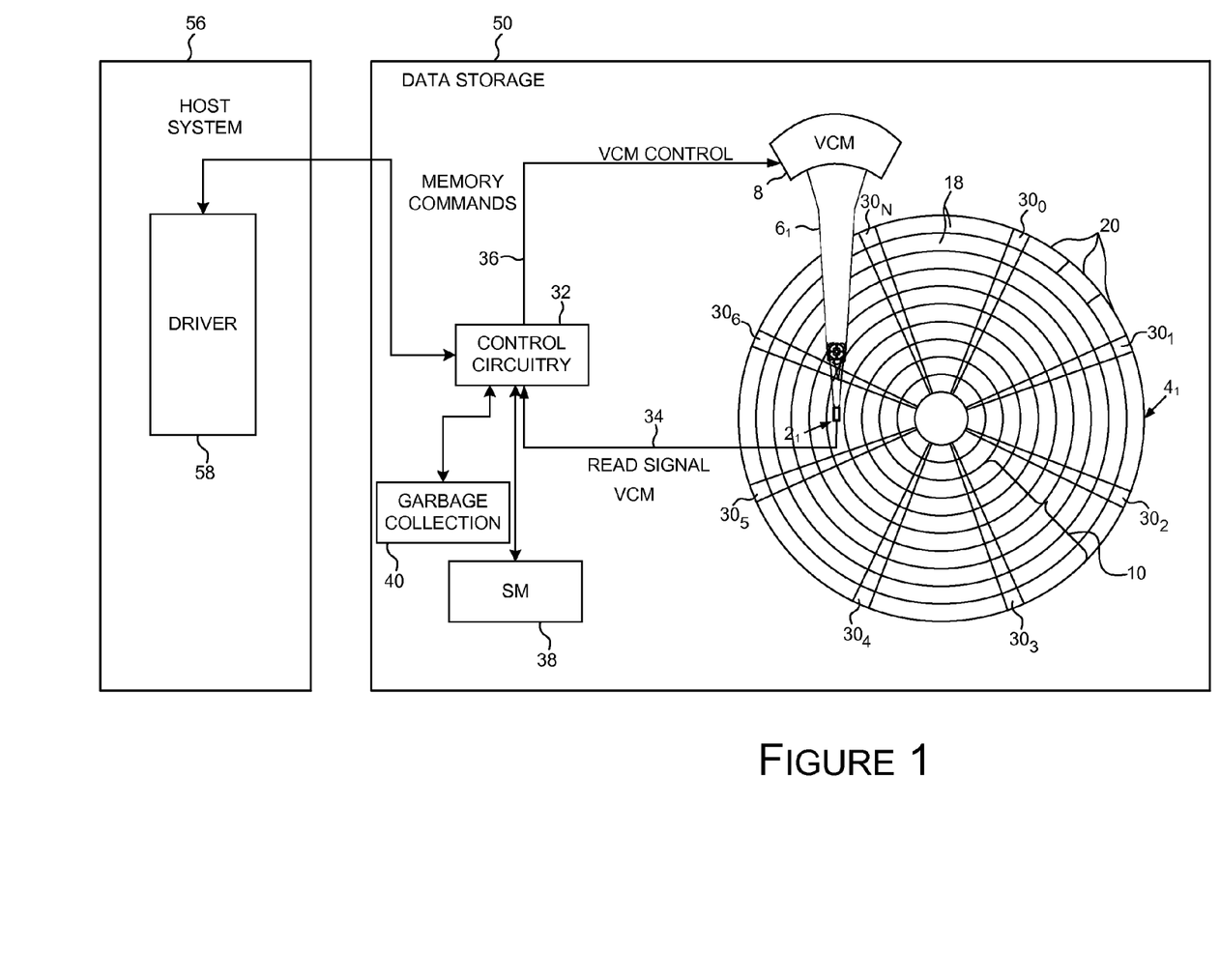
FIG. 1 is a block diagram illustrating a disk-based data storage device according to one embodiment.

FIG. 1 shows a disk-drive based data storage device 50 according to one embodiment. The data storage device 50 includes a head $2_1$ actuated radially over a disk surface $4_1$ by an actuator arm $6_1$, and a voice coil motor (VCM) 8 operable to rotate the actuator arm $6_1$ about a pivot. The disk surface $4_1$ comprises a host addressable area 10 with a plurality of data tracks 18, wherein each data track 18 comprises a plurality of data blocks 20.

In the embodiment in FIG. 1, the disk surface $4_1$ further comprises a plurality of embedded servo sectors $30_0$-$30_N$ that define the data tracks 18 in the host addressable area 10. The data storage device 50 further comprises control circuitry 32, which is operable to process a read signal 34 emanating from the head $2_1$ to demodulate the embedded servo sectors $30_0$-$30_N$ and generate a position error signal (PES). The PES represents a radial offset of the head $2_1$ from a target data track 18 in the host addressable area 10. The control circuitry 32 is further operable to process the PES with a suitable servo compensator to generate a VCM control signal 36 applied to the VCM 8. The VCM 8 rotates the actuator arm $6_1$ about a pivot in order to actuate the head 21 radially over the disk surface $4_1$ in a direction that decreases the PES. The control circuitry 32 is also configured to receive commands from a driver 58 in the host system 56.

In one embodiment, the data storage device 50 further comprises a garbage collection module 40 for managing garbage collection operations. In another embodiment, the control circuitry 32 manages garbage collection operations. The management and execution of garbage collection operations will be further described below.

In one embodiment, the data storage device 50 further comprises a buffer in a memory, such as a semiconductor memory (SM) 38, communicatively coupled to the control circuitry 32. The SM 38 may serve as a cache for temporarily storing write data received from the host 56 via a write command and read data requested by the host 56 via a read command. The SM 38 can be implemented, for example, using dynamic random access memory (DRAM), flash memory, or static random access memory (SRAM).

In addition, the SM 38 may provide storage for a translation table used by the control circuitry 32. The translation table provides a data structure for mapping the logical block addresses (LBAs) requested by the host 56 into physical locations on the data storage device 50, such as on disk surfaces 4. On data storage devices that implement shingled magnetic recording, such as those shown in FIG. 2, commands from the host 56 are recorded sequentially, resulting in LBA indirection. Since there is no fixed location on the data storage device 50 for a given LBA, control circuitry 32 maintains the translation table to keep track of the locations of the LBAs. For example, when a LBA is rewritten, a newer copy of that LBA will be written in a new location on the disk surfaces 4, and control circuitry 32 then updates the translation table to reflect the latest physical location of that LBA.

Data storage devices, including solid-state drives (SSDs) and shingled disk drives typically require garbage collection. This is due to the fact that LBAs for blocks of data are usually not rewritten to the same physical location they were before the rewrite operation. Since LBAs are rewritten in a new location, the old location becomes obsolete or invalid, and thus, may be considered "garbage". The media and storage space consumed by the garbage should be reclaimed so that it can be reused.

Figure 2:
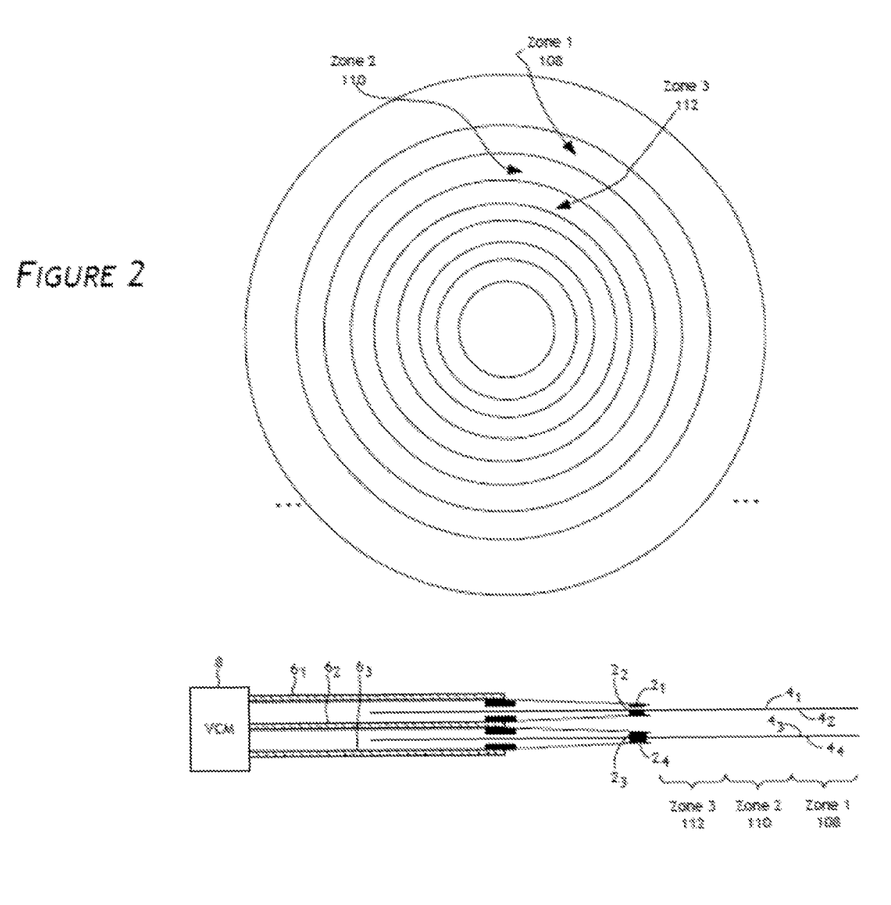
FIG. 2 is a block diagram illustrating a shingled disk storage device with a plurality of zones according to one embodiment.

FIG. 2 is a block diagram illustrating a shingled disk storage device with a plurality of zones according to one embodiment. One embodiment of the data storage device 50 may be a shingled-based disk drive in which the control circuitry 32 accesses at least part of the storage using log structure writes wherein a band of the data tracks are accessed as a circular buffer. In the shingled-based disk drive embodiment, data tracks are written in a shingled (overlapping) manner.

As shown, for example, the data storage device 50 is divided into multiple zones, including a zone 1 (108), a zone 2 (110), and a zone 3 (112). A plurality of heads $2_1$-$2_4$ are actuated over respective disk surfaces $4_1$-$4_4$ by a VCM 8 which rotates actuator arms $6_1$-$6_3$ about a pivot. In one embodiment, each of disk surfaces $4_1$-$4_4$ comprises a host addressable area 10 comprising a plurality of data tracks 18. A zone may span multiple layers of the disk as shown. For example, zone 1 (108) may span a portion of the disk surfaces $4_1$, $4_2$, $4_3$, and $4_4$ as indicated by the bracket. Similarly, zone 2 (110) may span a portion of the disk surfaces $4_1$, $4_2$, $4_3$, and $4_4$ as indicated by the bracket.

According to one embodiment, the data storage device 50 is a shingled-based disk drive in which the control circuitry 32 accesses at least part of the storage using log structure writes wherein a band of the data tracks are accessed as a circular buffer. New data is written to the head (current data track), and during a garbage collection operation, valid data is relocated from the tail of the buffer (old data tracks) to the head of the buffer so as to free space for new write data. In the shingled-based disk drive embodiment, data tracks are written in a shingled (overlapping) manner.

Figure 3:
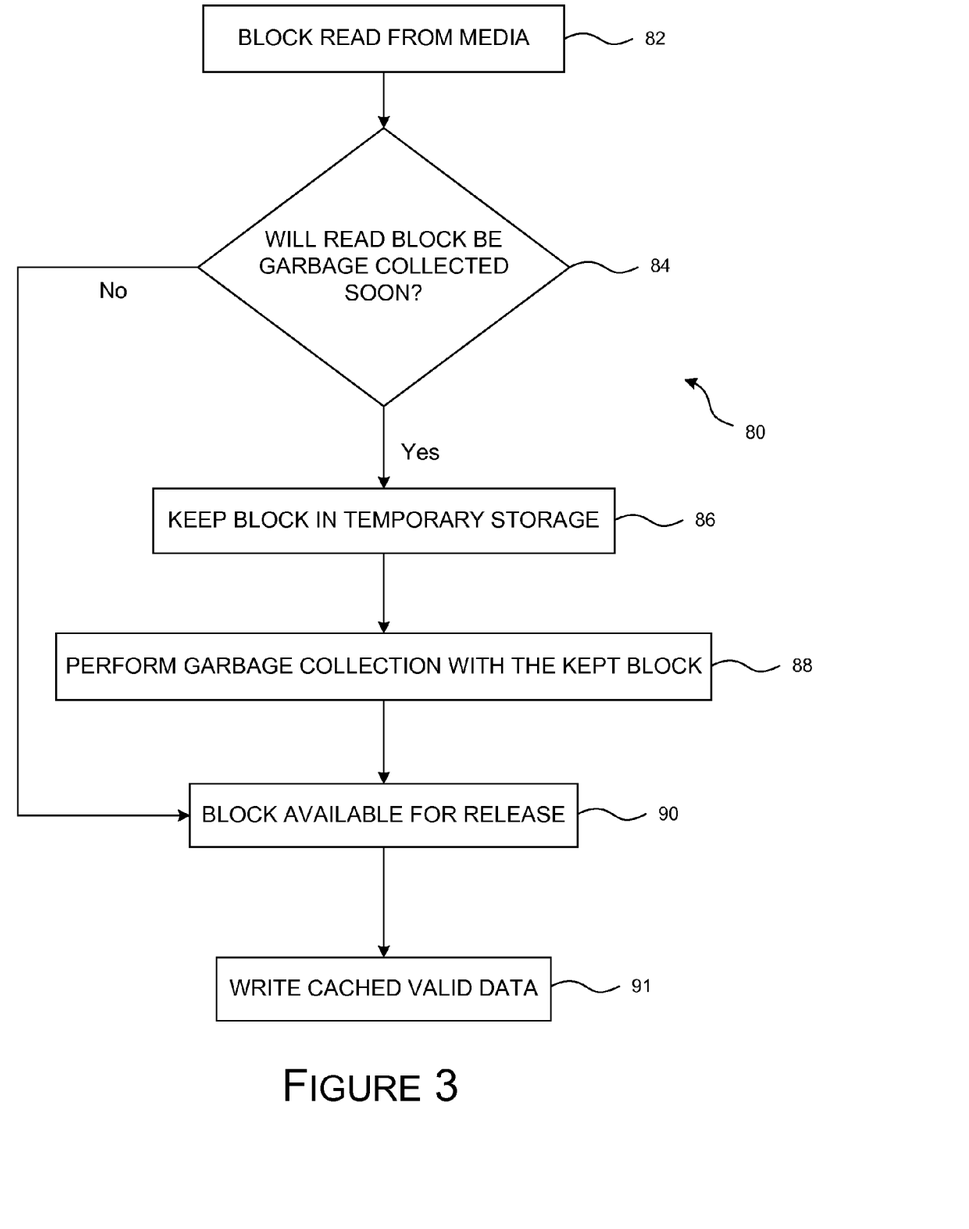
FIG. 3 is a flow diagram showing a process executed by the garbage collection module and/or the control circuitry to optimize garbage collection and opportunistically perform defragmentation in accordance with one embodiment.

FIG. 3 is a flow diagram showing a process 80 executed by the garbage collection module 40 and/or the control circuitry 32 to optimize garbage collection and opportunistically perform defragmentation in accordance with one embodiment. As noted, garbage collection requires moving blocks of data, which typically requires a read operation followed by a write operation. However, this shuffling of reading and writing data can negatively impact overall performance of the drive. Accordingly, since defragmentation also requires moving data, the embodiments take advantage of the read operation performed during a garbage collection process and optimize the rewriting of the user data. For example, when a buffer assigned for garbage collection process is full with valid data, the embodiments attempt to coalesce the data before it is written back to the media on the data storage device 50. In addition, by coalescing the data, a fewer number of entries are required by the translation table, and thus, minimizing the size consumed by the translation table as well.

In addition, control circuitry 32 and/or garbage collection module 40 may be configured to balance the respective results of garbage collection versus defragmentation. In particular, in some instances, garbage collection may increase defragmentation and vice versa. For example, during defragmentation, data is moved, which thus results in garbage being created. Accordingly, in some embodiments, control circuitry 32 and/or garbage collection module 40 may be configured to optimize one process over the other. Thus, the control circuitry 32 and/or garbage collection module 40 may be configured to modify how data is written back to the disk surface 4 to overwrite areas that are marked as garbage based on a number of factors, such as vicinity, track location, head position of head 21, etc.

For example, during garbage collection, the control circuitry 32 and/or garbage collection module 40 may opportunistically create garbage to help defragmentation. As another example, during garbage collection, the defragmentation process may take advantage of "gaps", e.g., relatively isolated blocks of invalid data and fill in these gaps with coalesced data from the cache. This fill-in process can be based on proximity to valid data. In some embodiments, proximity can be based on seek operation, rotational tolerance of the head 21, track location, and the like.

Referring now to FIG. 3, in phase 82, a memory block is read from the media of the data storage (e.g. the shingled disk drive). In one embodiment, the memory block may be read in response to a read command from the host 56. In other embodiments, the memory block may be read in response to other commands generated by the data storage device 50 (e.g. wear leveling command if the data storage is a solid-state memory device).

In phase 84, the block retrieved from the read operation is analyzed to determine it is valid, invalid, and/or will be garbage collected soon. The determination of a block's status is further described below with reference to FIG. 4.

In phase 86, if the read block is determined to be valid (i.e., data that should be retained), the data contents of the read block are cached. For example, the contents of the read block may be stored in a cache assigned in the semiconductor memory (SM) 38. In one embodiment, data from the read block may be placed in a read cache as part of processing the read command, or may already exist in the read cache because of a prior read command. In one embodiment, the valid data cached in SM 38 may be coalesced such that valid data that was previously fragmented is now defragmented. For example, the valid data may be cached so that it is contiguously stored on the disk. Of course, the valid data may be coalesced and reordered by the control circuitry 32 when rewritten.

In addition, in phase 86, read blocks for invalid (i.e., data that can be flushed), may also be may be stored in the semiconductor memory (SM) 38. In one embodiment, the data from the read block is tagged with a "dirty" flag/bit that is used by the read cache to mark data that should be retained for later flushing to the disk. In one embodiment, the data from the read block is tagged with a special flag/bit in place of or in addition to the "dirty" flag/bit to enable the read cache to differentiate data from the read block (which will be used for garbage collection) from other data that should be retained for flushing to the disk in the normal course of operation. In either case, in the embodiment with the read cache, the garbage collection module 40 and/or the control circuitry 32 may prevent data from the read block from being flushed from the read cache during the normal read cache flushing cycles. The read cache may thus implement different flushing policies for the different types of data.

In phase 88, garbage collection is then performed on the blocks of invalid data cached in phase 86. For example, the blocks may be flushed to disk.

In phase 90, once garbage collection is performed, the contents of the read block are made available for release. In the alternative, if the read block is determined to not be garbage collected soon in phase 84, the process 80 skips to phase 90, where the contents of the read block are made available for release.

In phase 91, the control circuitry 32 then writes the cached valid data in the SM 38 back to the disk surfaces 4 such that fewer disk operations are needed to retrieve the blocks when requested by a next read command. In one embodiment, the control circuitry 32 writes the cached data back to the disk surfaces in coalesced form such that the blocks are contiguously or substantially contiguously located on the disk surfaces 4. That is, the blocks for data requested by the read command are rewritten in a contiguous manner on the disk surfaces 4. That is, the blocks of data are written to physically adjacent locations on the disk surfaces 4.

For example, in one embodiment, the control circuitry 32 issues a write command that comprises a number of logical block addresses (LBAs) and write data. In some embodiments, the control circuitry 32 may also write other information, such as, such as a timestamp. Of note, in a hybrid drive embodiment, metadata may be stored in flash memory while user data is stored on the disk.

The rewriting of the valid data in coalesced form may be triggered based on a number of factors. For example, the cache for valid data in SM 38 may be configured with a fixed size, such as 32 megabytes. Accordingly, once this cache for valid data reaches a threshold, such as 90%, 80%, etc., the control circuitry 32 may be configured to commence rewriting the valid data in coalesced form.

Furthermore, the control circuitry 32 may then optimize the translation table stored in the SM 38 based on the coalesced data that has been rewritten to the disk surfaces 4. For example, the control circuitry 32 may compress one or more entries using a starting LBA of the coalesced data and a run length. The control circuitry 32 may also compress the translation table by encoding its entries to reduce its required size.

Figure 4:
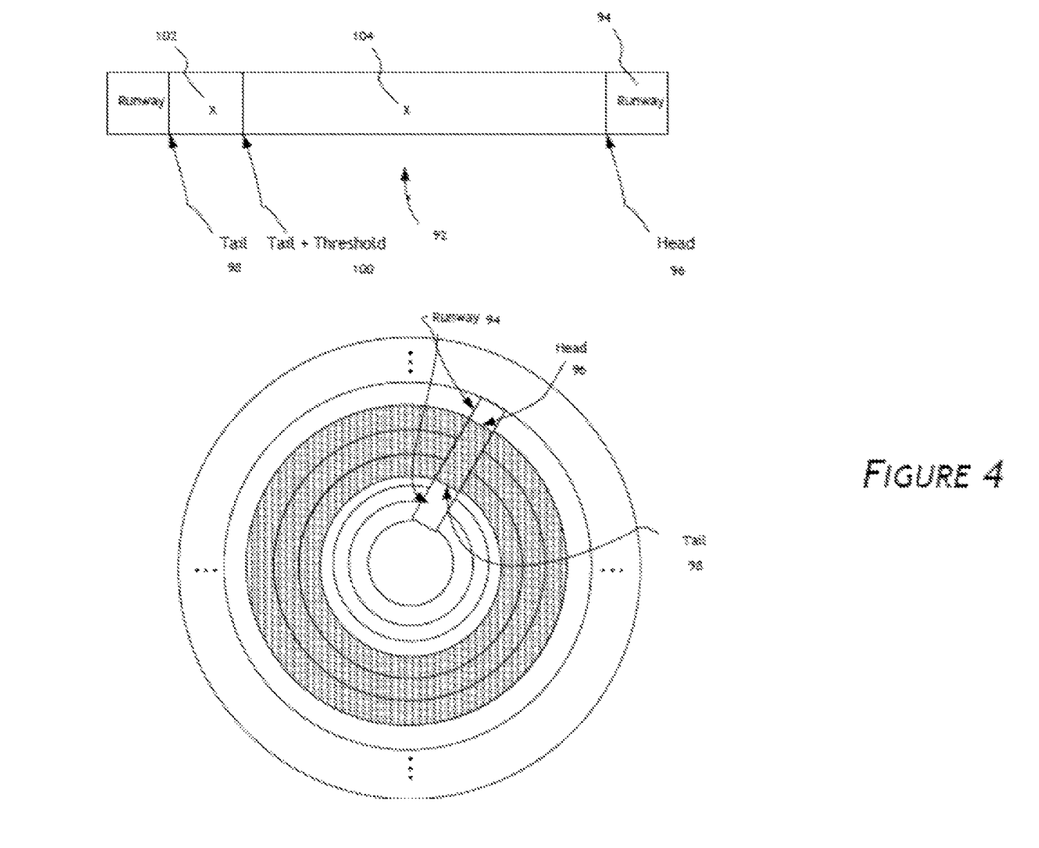
FIG. 4 is a block diagram further illustrating how data is determined to be invalid or garbage collected soon.

FIG. 4 is a block diagram further illustrating how data is determined to be valid, invalid, or garbage collected soon. Although the example shows data being written to the shingled disk storage device in a circular buffer, the garbage collection optimization embodiments of the invention are applicable to storage devices that implement other data access policies (e.g., zone-based access).

As shown, data is written to the disk-based storage device 50 in a circular buffer 92 with a head 96 and a tail 98. Data is written in an area between the head and the tail, with new data being written in the direction from the tail toward the head. A runway 94 is shown in the circular buffer 92 after the head 96 and before the tail 98 where new data may be written to without overwriting valid data. In operation, new data is written at the head 98, and the head 98 is moved forward into the runway area 92 after each write in one embodiment. The circular buffer 92 is circular in the sense that the runway spans the area between the head and the tail, and the head is moving toward the tail.

In one embodiment, garbage collection is performed at the tail to prevent the exhaustion of the runway 94. Therefore, data located near the tail has a higher likelihood of being invalid or garbage collected in the near future. FIG. 4 shows two example data points 102 and 104. In the determination made in phase 84, the process 80 determines whether a block read from the media of the data storage device 50 should be saved for a later garbage collection operation. In the example of data point 102, the determination would be positive since it falls into a range between the tail and a location of the tail offset by a threshold (tail+threshold). Since data in this range is likely to be needed soon for a garbage collection operation, saving it as part of fulfilling a read operation now (e.g., for a host read command) would eliminate the need to re-read the same data when the garbage collection operation is executed. On the other hand, data point 104 would not be saved for a future garbage collection operation since it falls outside of the range. In one embodiment, the determination needs to be made as there is typically limited space in the temporary storage where data can be saved.

In one embodiment, the threshold is based at least in part on the likelihood that a garbage collection operation will be needed soon. For example, a long runway may mean that garbage collection operation is not likely to be needed soon. Thus, the threshold may be set to be shorter. If the runway is short, then garbage collection is likely to be needed soon, and as a result the threshold may be set to be longer. The threshold may be measured by a number of memory units such as sectors, blocks, or tracks depending on the embodiments. In one embodiment, the threshold may be a fixed number of blocks from the tail, and if the read block falls in the range of the threshold, the read block will be saved for garbage collection. In another embodiment, the number of blocks from the tail may be adjustable, e.g., based on the size of the runway.

In one embodiment, additional data may be saved along with the read block. For example, in a shingled disk drive embodiment, if a host read command results in a read from a block "A," data from the entire track in which block "A" is located may also be read and saved for future garbage collection operations.

In one embodiment, when garbage collection is needed, the read block may not be stored in temporary storage but instead written directly to a new location, such as the head 96, as part of a garbage collection operation. For example, a read command from the host system 56 may trigger a garbage collection operation if the read data is near the tail and the runway 94 is running out of available space. In this case, the data is read from the target block of the read command, together with any adjacent blocks, and returned to the host and then written to a new location as part of a garbage collection operation. In another example, the read block is near the tail 98, so all of the valid blocks from the tail 98 to the read block may be read and moved to the head 96 so that a garbage collection operation can increase the runway 94 while servicing a host command.

In one embodiment, each block in the data storage device 50 is time-stamped and the control circuitry 32 and/or the garbage collection module 40 is configured to maintain a list of blocks that are least recently used (LRU) (i.e., least recently written). The LRU list may be used to determine whether the data contents of a block should be migrated to another location as part of a garbage collection operation. In one embodiment, the contents of a block that appears on the LRU list are saved for migration. In one embodiment, the contents of a block with a time stamp that meets a minimum LRU criterion are saved for migration.

The various afore-mentioned methods of determining whether to keep data read as a part of a read command may be combined. For example, the LRU list may be combined with the list of zones sorted by the number of invalid blocks, so that instead of saving read data from any block from the top zones on the list, the determining process only saves data from those blocks that are listed on the LRU lists for the individual zones. Alternatively, the garbage collection module may garbage collect zones independent of the number of invalid blocks, such as by following a round-robin approach. In this embodiment, the read block may be migrated to another zone if it is determined that the zone the read block is currently located in is close to being next in order for garbage collection. Other garbage collection schemes may be used.

Figure 5:
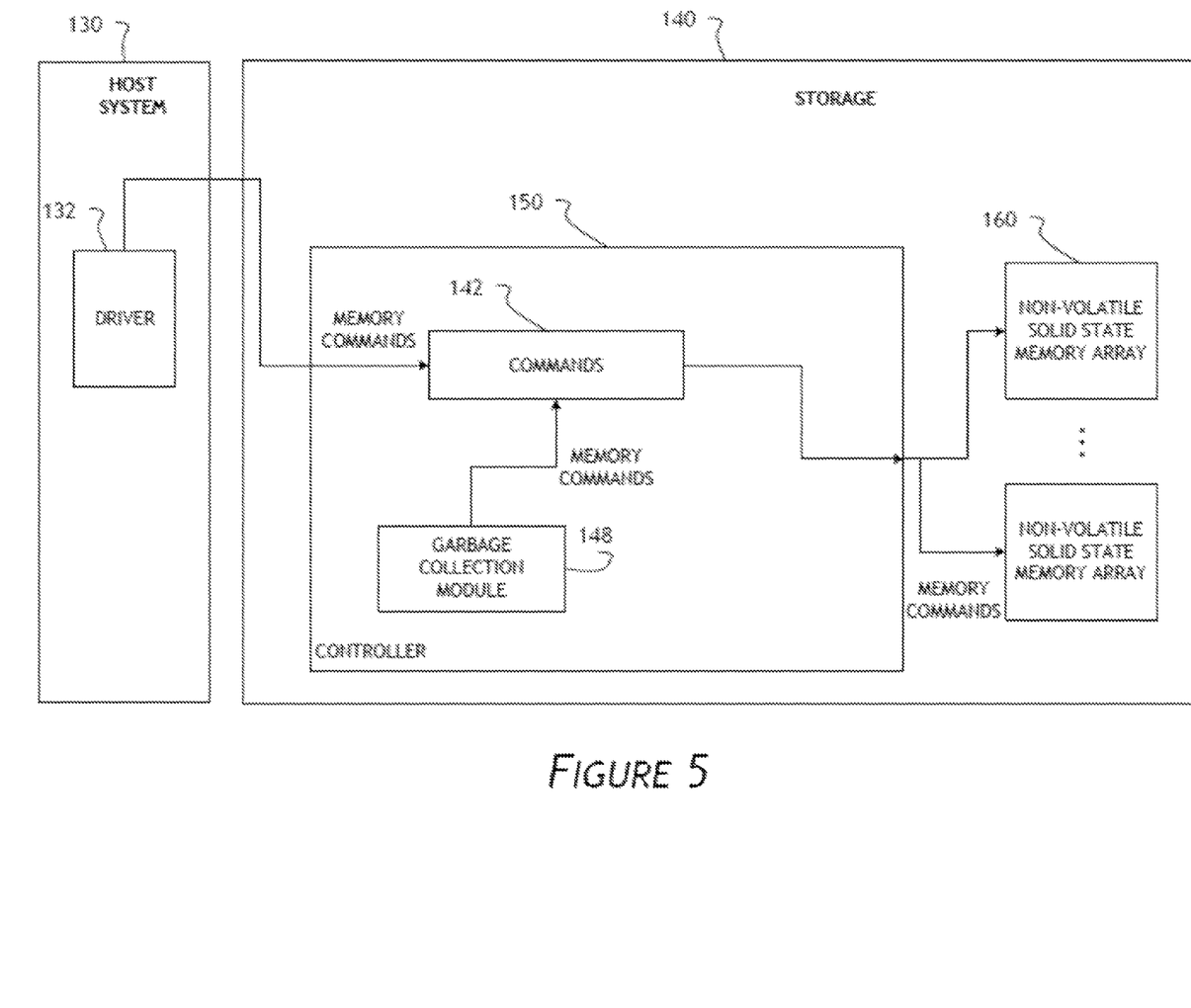
FIG. 5 is a block diagram illustrating a solid-state storage subsystem according to one embodiment.

FIG. 5 is a block diagram illustrating a solid state memory-based data storage device according to one embodiment. As shown, a data storage device 140 includes a controller 150, which in turn includes a command queue 142 and a garbage collection module 148, which is configured to execute the at least some of the garbage collection operations described above. For example, the garbage collection module 148 may perform some or all of the functionalities performed by the garbage collection module 40 of the data storage device 50. The garbage collection module 148 in one embodiment is configured to execute process 80 for each read command received in the command queue 142. In one embodiment, the host command queue 142 receives memory commands from a driver 132 residing within a host system 130, and the memory commands may include write and read commands issued by the host system 130. As further shown in FIG. 5, in one embodiment, the controller 150 executes the commands in the host command queue 142 in one or more non-volatile solid-state memory arrays 160, as well as commands issued by the garbage collection module 148. The commands from the garbage collection module 148 may be stored in the command queue 142 or in a separate queue.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method of defragmenting a data storage device, said method comprising:
   receiving a read command from a host;
   reading a first block of data stored in non-volatile media of a data storage device in response to the read command from the host;
   determining a timing of garbage collection for the first block in response to reading the first block of data;
   caching valid data of the first block in response to said determination;
   coalescing the valid data;
   identifying invalid data in a second block of data stored in the non-volatile media; and
   rewriting back the coalesced valid data to the second block.

2. The method of claim 1, wherein rewriting back the coalesced valid data to the second block comprises writing back the coalesced valid data in a contiguous sequence on the non-volatile media according to logical block addresses assigned to the coalesced valid data.

3. The method of claim 1, wherein the first block of data is part of a circular buffer on the non-volatile media.

4. The method of claim 3, wherein said determining comprises determining that the first block is located within a threshold number of memory units of a tail of the circular buffer.

5. The method of claim 1, further comprising updating a translation table at least in part by encoding a starting logical block address and run length for new physical locations associated with the coalesced data.

6. The method of claim 1, wherein said caching the valid data comprises caching the valid data in a buffer designated for garbage collection until a threshold is reached.

7. The method of claim 6, wherein said coalescing the valid data is initiated by the data storage device when the threshold has been reached and comprises reordering the valid data based on logical block addresses in a sequential order.

8. A data storage device comprising:
   a non-volatile medium;
   a memory providing at least one cache for storing data from read operations;
   an interface configured for communications with a host; and
   a controller configured by a plurality of instructions, which comprise instructions for:
      receiving a read command from the host;
      reading valid data from a first block of data stored in the non-volatile medium in response to the read command from the host;
      determining a timing of garbage collection for the first block in response to reading the valid data from the first block of data;
      caching the valid data of the first block in response to said determination;
      coalescing the valid data;
      identifying invalid data in a second block stored in the non-volatile medium; and
      rewriting back the coalesced valid data to the second block.

9. The data storage device of claim 8, wherein the controller is further configured to coalesce the valid data based on logical block addresses assigned to the valid data.

10. The data storage device of claim 8, wherein the controller is further configured to coalesce the valid data based on when the cache reaches a threshold.

11. The data storage device of claim 10, wherein the controller is further configured to coalesce the valid data based on when the cache is full.

12. The data storage device of claim 10, wherein the controller is further configured to coalesce the valid data into a contiguous sequential order according to logical block addresses assigned to the valid data.

13. A method of optimizing a translation table stored in a memory of a data storage device, wherein the translation table dynamically maps logical block addresses used by a host to physical locations on the data storage device, said method comprising:
    receiving a first block of data from one or more read operations performed on a data storage device;
    determining a timing of garbage collection for the first block in response to receiving the first block of data;
    caching valid data of the first block in response to said determination;
    coalescing the valid data;
    identifying invalid data stored in a second block of data;
    rewriting back the coalesced valid data to the second block; and
    updating a translation table to indicate new locations of the coalesced data that has been rewritten back to the data storage device.

14. The method of claim 13, wherein updating the translation table comprises determining a starting logical block address for the cached valid data and a run length.

15. The method of claim 13, further comprising compressing the translation table to reduce memory consumed by the translation table.

16. The method of claim 13, wherein updating the translation table comprises reducing a number of translation nodes used by the translation table.

17. The method of claim 13, wherein coalescing the valid data comprises coalescing the valid data when a cache has been filled with identified valid data from a garbage collection process.

* * * * *